(12) United States Patent
He et al.

(10) Patent No.: US 11,483,239 B2
(45) Date of Patent: Oct. 25, 2022

(54) PORT CONFIGURATION METHOD AND DEVICE, STORAGE MEDIUM, AND ELECTRONIC DEVICE

(71) Applicant: Suzhou Centec Communications Co., Ltd., Jiangsu (CN)

(72) Inventors: Zhichuan He, Jiangsu (CN); Maocong Zhao, Jiangsu (CN); Jie Zhou, Jiangsu (CN); Lei Li, Jiangsu (CN); Zicang Zhao, Jiangsu (CN)

(73) Assignee: Suzhou Centec Communications Co., Ltd., Jiangsu (CN)

( * ) Notice: Subject to any disclaimer, the term of this patent is extended or adjusted under 35 U.S.C. 154(b) by 0 days.

(21) Appl. No.: 17/288,923

(22) PCT Filed: Oct. 29, 2019

(86) PCT No.: PCT/CN2019/114066
§ 371 (c)(1),
(2) Date: Apr. 27, 2021

(87) PCT Pub. No.: WO2020/088465
PCT Pub. Date: May 7, 2020

(65) Prior Publication Data
US 2021/0399984 A1     Dec. 23, 2021

(30) Foreign Application Priority Data

Oct. 29, 2018   (CN) .......................... 201811271454.7

(51) Int. Cl.
*H04L 45/00* (2022.01)
*H04L 12/46* (2006.01)
*H04L 41/0823* (2022.01)
*H04L 69/324* (2022.01)

(52) U.S. Cl.
CPC .......... *H04L 45/66* (2013.01); *H04L 12/4641* (2013.01); *H04L 41/0823* (2013.01); *H04L 69/324* (2013.01)

(58) Field of Classification Search
None
See application file for complete search history.

(56) References Cited

U.S. PATENT DOCUMENTS

2017/0237627 A1    8/2017   Nair et al.

FOREIGN PATENT DOCUMENTS

| CN | 101931607 A | 12/2010 | |
|---|---|---|---|
| CN | 102185781 A | 9/2011 | |
| CN | 102368726 A | 3/2012 | |
| CN | 102710468 A | 10/2012 | |
| CN | 109639451 A | 4/2019 | |
| WO | WO-2014032598 A1 * | 3/2014 | ......... H04L 12/4641 |

* cited by examiner

*Primary Examiner* — Christine T Duong
(74) *Attorney, Agent, or Firm* — Yu Gang

(57) ABSTRACT

Provided are a port configuration method and device, a storage medium, and an electronic device. Said method comprises: receiving a target message, the target message being a message which is transmitted through a physical port of a data link layer and carries target identifier information; searching, in a plurality of access modes supported by the physical port, for a target access mode corresponding to the target identifier information; and configuring the current access mode of the physical port in the data link layer to be the target access mode.

13 Claims, 3 Drawing Sheets

PORT CONFIGURATION METHOD AND DEVICE, STORAGE MEDIUM, AND ELECTRONIC DEVICE

CROSS-REFERENCE TO RELATED APPLICATION

The present disclosure claims priority to Chinese Patent Priority No. 201811271454.7, filed to the China National Intellectual Property Administration on Oct. 29, 2018, the disclosure of which is hereby incorporated by reference in its entirety.

TECHNICAL FIELD

The present disclosure relates to the field of communications, and more particularly to a port configuration method and device, a storage medium, and an electronic device.

BACKGROUND

In an AC port of a L2VPN (L2 Virtual Private Network) network (VPLS (Virtual Private Lan Service) or VPWS (Virtual Pseudo Wire Service) in the related art, two types of accesses of message packages is provided, namely, a virtual local area network (VLAN) access and an Ethernet access:

The VLAN access: an Ethernet frame header sent by CE (Customer Edge) to PE (Provider Edge) or sent by the PE to the CE has a VLAN TAG (virtual local area network tag). The TAG is a service delimiter that is pushed by the service provider network to distinguish users. The service delimiter is generally added by the equipment of the service provider. This TAG as the service delimiter is called as P-TAG.

The Ethernet access: no service delimiter is provided in the Ethernet frame header sent by the CE to the PE or sent by the PE to the CE. If the VLAN TAG is provided in the frame header at this time, it means that the VLAN TAG is only an internal VLAN TAG of a user message, it means nothing for PE equipment. This TAG of the user internal VLAN is called as U-TAG.

In a related implementation solution, one AC (Attachment Circuit) port in the L2VPN is limited to one type of access, that is, the Ethernet access or the VLAN access, as shown in FIG. 1. When an MPLS (Multiple protocol Label Switching) network is deployed, if two access modes are provided in the network, at least two ports are required.

As to the problem of poor versatility of the AC port in the L2VPN network in the related art, no effective solutions have been proposed yet.

SUMMARY

The embodiments of the present disclosure provide a port configuration method and device, a storage medium, and an electronic device to at least solve the problem of poor versatility of an AC port in an L2VPN network in the prior art.

According to one embodiment of the present disclosure, provided is a port configuration method, which includes the following steps: receiving a target message, the target message being a message which is transmitted through a physical port of a data link layer and carries target identifier information; searching, in a plurality of access modes supported by the physical port, for a target access mode corresponding to the target identifier information; and configuring the current access mode of the physical port in the data link layer to be the target access mode.

In an embodiment, the step of searching, in the plurality of access modes supported by the physical port, for the target access mode corresponding to the target identifier information comprises: searching for the target access mode corresponding to the target identifier information in a preset port table, where the port table saves a mapping relationship between each of the plurality of access modes and the corresponding identifier information.

In an embodiment, the step of configuring the current access mode of the physical port in the data link layer to be the target access mode comprises: generating a first keyword corresponding to the target message according to the target access mode; and configuring a first identification bit corresponding to the target message in a physical port identification table as the first keyword, wherein the first keyword indicates an action, in an execution action table, for configuring the current access mode of the physical port as the target access mode.

In an embodiment, the step of generating the first keyword corresponding to the target message according to the target access mode comprises: when the target access mode is a first mode, the first keyword is a default keyword and a target identifier carried in the target message; when the target access mode is a second mode, the first keyword is the default keyword; wherein the first mode is the virtual local area network (VLAN) access mode, and the second mode is the Ethernet access mode.

In an embodiment, the first keyword indicating the action in the execution action table for configuring the current access mode of the physical port as the target access mode comprises: setting a second keyword according to the first keyword in the action table according to the first keyword; setting the second keyword as P-TAG in a case that the target access mode is the first mode; and setting the second keyword as U-TAG in a case that the target access mode is the second mode.

In an embodiment, after the current access mode of the physical port in the data link layer is configured as the target access mode, the method further comprises: using a target logical port matching the target access mode in the plurality of logical ports as a logical port currently carried on the physical port, wherein the number of the physical port is one, and the plurality of logical ports are logical ports allowed to be carried on the physical port.

According to another embodiment of the present disclosure, provided is a port configuration device, which includes: a receiving module, configured to receive a target message, the target message being a message which is transmitted through a physical port of a data link layer and carries target identifier information; a searching module, configured to search, in a plurality of access modes supported by the physical port, for a target access mode corresponding to the target identifier information; and a configuration module, configured to configure the current access mode of the physical port in the data link layer to be the target access mode.

In an embodiment, the searching module further comprises: a searching unit, configured to search for the target access mode corresponding to the target identifier information in a preset port table, where the port table saves a mapping relationship between each of the plurality of access modes and the corresponding identifier information.

According to another embodiment of the present disclosure, further provided is a storage medium. A computer program is stored in the storage medium, where the computer program is configured to execute steps in any one of embodiments of a foregoing method when the computer program is operated.

According to another embodiment of the present disclosure, further provided is an electronic device, which includes a memory and a processor. A computer program is stored in the memory. The processor is configured to execute the computer program to execute steps in any one of embodiments of a forgoing method.

In the above embodiments of the present disclosure, since a current access mode of a physical port can be configured as a target access mode by searching for the target access mode corresponding to a target message. Therefore, the problem of poor versatility of an AC port in a L2VPN network can be solved, thereby achieving the effect of improving the versatility of the AC port.

BRIEF DESCRIPTION OF THE DRAWINGS

The drawings described here are used to provide a further understanding of the present disclosure and constitute a part of the application. The exemplary embodiments of the present disclosure and the description thereof are used to explain the present disclosure, and do not constitute an improper limitation thereto. In the drawings.

DETAILED DESCRIPTION OF THE EMBODIMENTS

Hereinafter, the present disclosure is described in detail with reference to the drawings and in conjunction with embodiments. It should be noted that the embodiments in this application and the features in the embodiments may be combined with each other if there is no conflict.

It should be noted that the terms "first" and "second" in the description and claims of the present disclosure and the forgoing drawings are used to distinguish similar objects, but are not necessarily used to describe a specific order or sequence.

Figure 1:
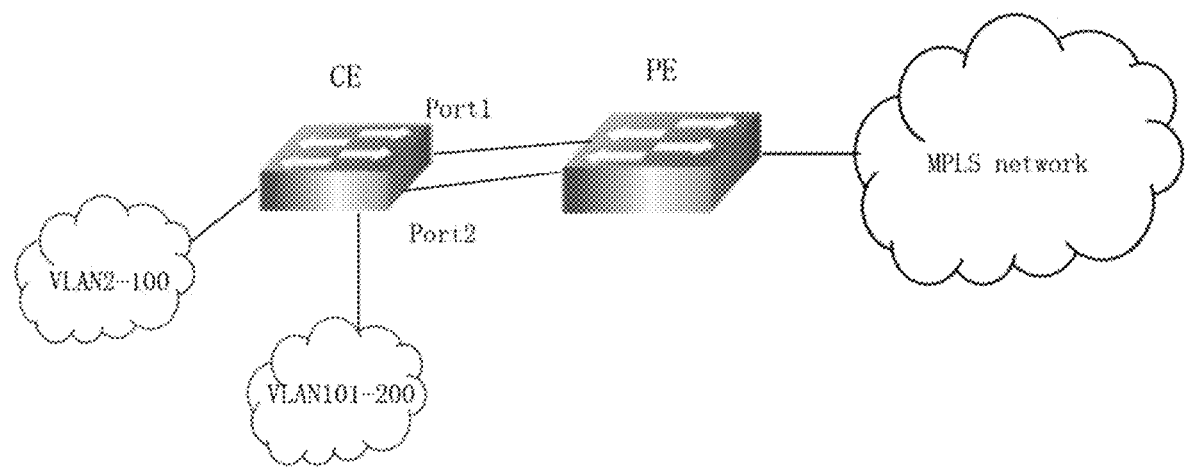
FIG. 1 is an access mode of a port in L2VPN in the prior art according to an embodiment of the present disclosure.

An embodiment of the present application may be executed on a network architecture shown in FIG. 1. As shown in FIG. 1, the network architecture comprises CE and PE, where the CE sends a received message to the PE.

Figure 2:
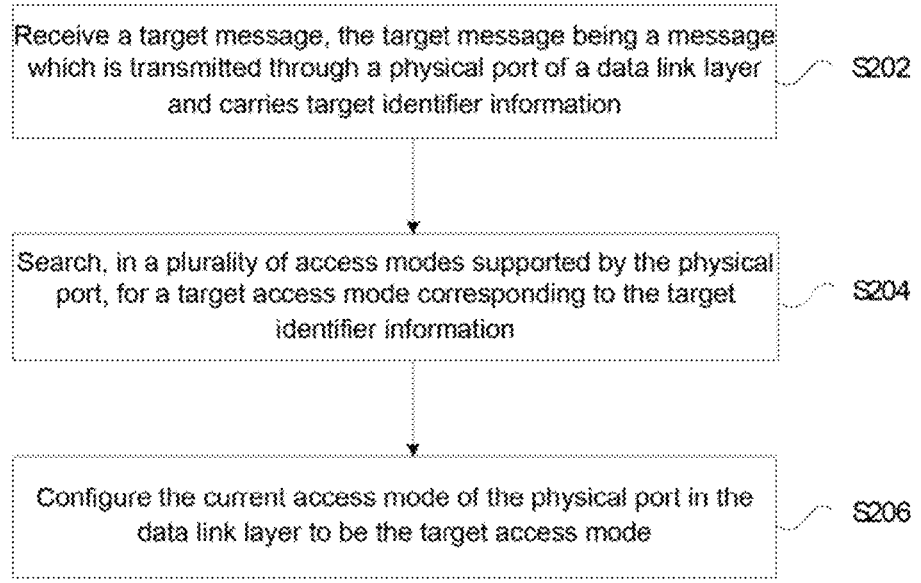
FIG. 2 is a flowchart of port configuration according to an embodiment of the present disclosure.

In this embodiment, provided is a port configuration method executed on a network architecture. FIG. 2 is a flowchart of port configuration according to an embodiment of the present disclosure. As shown in FIG. 2, the method comprises the following steps:

S202, receiving a target message, the target message being a message which is transmitted through a physical port of a data link layer and carries target identifier information.

S204, searching, in a plurality of access modes supported by the physical port, for a target access mode corresponding to the target identifier information.

The physical port is a virtual local area network (VLAN) access and an Ethernet access supported by an AC port of a L2VPN network.

S206: configuring a current access mode of the physical port in the data link layer to be the target access mode.

Through the foregoing steps, since the current access mode of the physical port can be configured as the target access mode by searching for the target access mode corresponding to the target message. Therefore, the problem of poor versatility of an AC port in the L2VPN network can be solved, thereby achieving the effect of improving the versatility of the AC port.

In an embodiment, the entities of the foregoing steps may be a switchboard or the like, but is not limited thereto.

Figure 3:
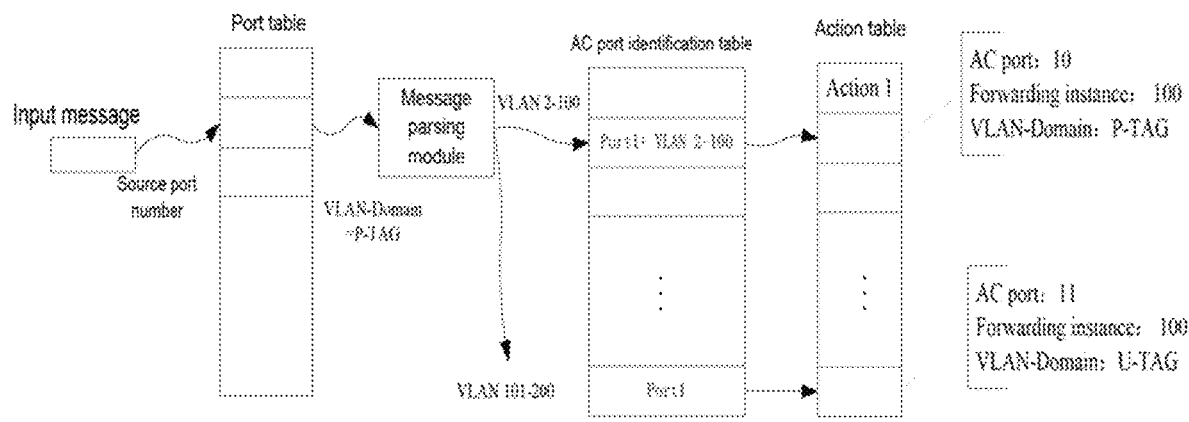
FIG. 3 is a schematic diagram of an AC port identification processing table during a hybrid access of a port in L2VPN according to an embodiment of the present disclosure.

In an optional embodiment, the step of searching, in the plurality of access modes supported by the physical port, for the target access mode corresponding to the target identifier information comprises: searching for the target access mode corresponding to the target identifier information in a preset port table, where the port table saves a mapping relationship between each of the plurality of access modes and the corresponding identifier information. In this embodiment, as shown in FIG. 3, after the AC port receives the message, the access mode corresponding to the received message is searched for in the port table according to the identifier carried in the message, and a mapping relationship between the identifier of the message and the corresponding access mode is saved in the preset port table. For example, the AC port receives and carries a message 1 identified as VLAN 2-100 and carries a message 2 identified as VLAN 101-200. The VLAN 101-200 pre-stored in the port table is the VLAN access, and the VLAN 2-100 pre-stored in the port table is the Ethernet access.

In an optional embodiment, the step of configuring the current access mode of the physical port in the data link layer to be the target access mode comprises: generating a first keyword corresponding to the target message according to the target access mode; and configuring a first identification bit corresponding to the target message in a physical port identification table as the first keyword, wherein the first keyword indicating an action, in an execution action table, for configuring the current access mode of the physical port as the target access mode. In this embodiment, after the access modes corresponding to the VLAN 2-100 and VLAN 101-200 are looked up in FIG. 3, and after the message parsing module parses out the VLAN 2-100 and VLAN 101-200, the first keyword is generated at a position corresponding to the VLAN 2-100 in an AC port identification table and corresponds to Port1+VLAN 2-100 in FIG. 3. The first keyword is generated at a position corresponding to the VLAN 101-200, and corresponds to Port1 in FIG. 3. The first keyword is configured to indicate the corresponding action in an action table in FIG. 3. As shown in FIG. 3, An AC port number corresponding to the Port1+VLAN 2-100 is arranged as 10 in the action table. A forwarding instance is arranged as 100, and VLAN-Domain (Virtual Local Area Network Domain) is arranged as P-TAG. An AC port number corresponding to Port1 (a port 1) is arranged as 11. The forwarding instance is arranged as 100, and the VLAN-Domain is arranged as U-TAG.

In an optional embodiment, the step of generating the first keyword corresponding to the target message according to the target access mode comprises: when the target access mode is a first mode, the first keyword is a default keyword and a target identifier carried in the target message; when the target access mode is a second mode, the first keyword is the default keyword; wherein the first mode is a virtual local area network (VLAN) access mode, and the second mode is an Ethernet access mode. In this embodiment, as shown in FIG. 3, A VLAN 2-100 message corresponding to the VLAN access mode generates the first keyword Port1+VLAN 2-100 together with the corresponding part of the VLAN 2-100 message in the AC port identification table, where the Port1 is the default keyword. The default keyword can be arranged arbitrarily as needed, for example, the default keyword can be a number, a character or a letter, whose specific form is not limited. A first keyword corresponding to the VLAN 101-200 is the default keyword Port1.

In an optional embodiment, the first keyword being configured to indicate as the target access mode the an execution action table the action for configuring the current access mode of the physical port comprises: setting a second keyword according to the first keyword in the action table according to the first keyword; setting the second keyword as the P-TAG in a case that the target access mode is the first mode; and setting the second keyword as the U-TAG in a case that the target access mode is the second mode. In this embodiment, the second keyword in the action table is arranged according to a first keyword in the AC port identification table. The second keyword is VLAN-Domain in the action table in FIG. 3. When the message is the VLAN access mode, the VLAN-Domain in the action table is arranged as the P-TAG. When the message is the Ethernet access mode, the VLAN-Domain in the action table is arranged as the U-TAG.

In an optional embodiment, after the current access mode of the physical port in the data link layer is configured as the target access mode, the method further comprises: using a target logical port matching the target access mode in the plurality of logical ports as a logical port currently carried on the physical port, wherein the number of the physical port is one, and the plurality of logical ports are logical ports allowed to be carried on the physical port. In this embodiment, the AC port is the physical port, and one AC port comprises the plurality of logical ports. As shown in FIG. 3, an AC port number assigned to the message is a port number of the logical port. For example, an AC port number corresponding to the Port1+VLAN 2-100 is arranged as 10 in the action table. An AC port number corresponding to the Port1 is arranged as 11.

Through the description of the forgoing embodiments, the person skilled in the art may clearly understand that the method according to the forgoing embodiments may be implemented through software and a necessary general hardware platform, and of course may also be implemented by hardware. However, in many cases, the former is better implementation. According to this understanding, the technical solution of the present disclosure could be essentially embodied in the form of a software product for a part that contributes to the prior art. The software product of a computer is stored in one storage medium (such as ROM/RAM, a diskette, and an optical disk) and includes a plurality of instructions which makes one port device (which could be a mobile phone, a server, a network device or the like) execute the method described in various embodiments of the present disclosure.

The following specific embodiments are further provided to describe the present disclosure.

Figure 4:
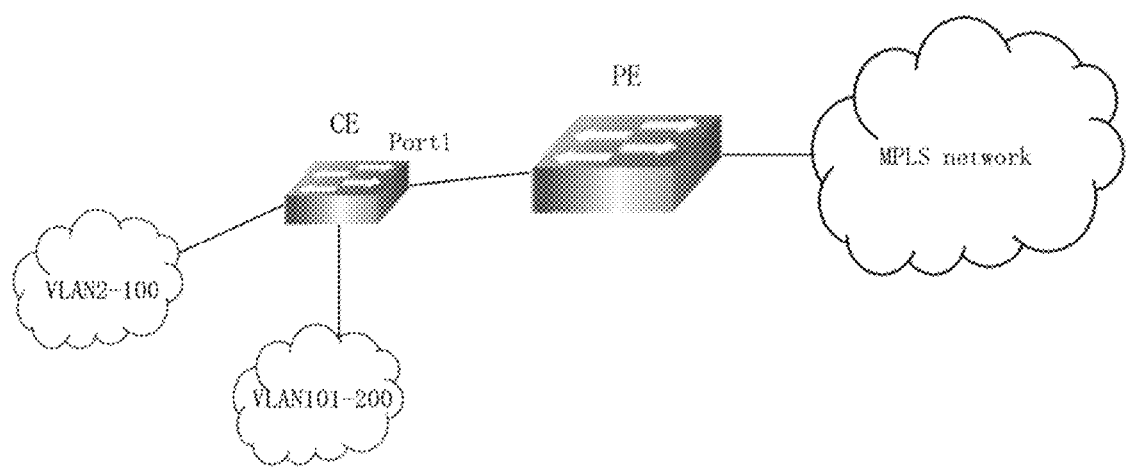
FIG. 4 is a hybrid access mode of a port in L2VPN according to an embodiment of the present disclosure.

When the network is deployed, any port on the switchboard can be configured as a hybrid access mode. As shown in FIG. 4, after the identifiers VLAN 2-100 and VLAN 101-200 carried in the message enter into the switchboard, at the entered AC port, VLAN Domain (Virtual Local Area Network Domain) of the AC port is first configured as a P-TAG domain, so that an outer layer of VLAN IDs carried in the message can be parsed as the P-TAG when the message is parsed. Thereafter, the message enters into an AC port identification processing module. The message that is expected as the VLAN access can be configured with Key (a keyword) based on the port number+the P-TAG at the AC port identification processing module. Meanwhile, the VLAN Domain in the action table remains unchanged and is still the P-TAG. The message that is expected as the Ethernet access does not need to be configured with the Key based on the port number+the P-TAG, but a default KEY (a keyword) based on the port number is used. Meanwhile, the VLAN Domian in the corresponding action table is changed as the U-TAG, which is processed as an internal TAG in subsequent processing, thereby realizing the Ethernet access.

The embodiment of the present disclosure uses a VPLS (Virtual Private Lan Service) as an example to fully explain the working principle of the present disclosure in conjunction with FIGS. 3 and 4. As shown in FIG. 4, it is assumed that the VLAN 2-100 carried in the message is expected to be the VLAN access. The VLAN 101-200 is expected to be the Ethernet access. After the message enters into an AC port 1 of a switchboard of a PE, a VLAN Domain of a port attribute of the port 1 is configured as the P-TAG so that the message can parse all the outer layer of the VLAN IDs as the P-TAG. As shown in FIG. 3, after the message enters from the port 1, the message parsing module can parse the message as the VLAN 2-100 and the VLAN 101-200. When a message of the VLAN 2-100 reaches the AC port identification table, a query entry based on the port number Port1+the VLAN 2-100 as the keyword is issued. The VLAN Domian in the corresponding action table continues to be maintained as the P-TAG. VLAN ID of the message continues to be processed as the outer layer of the VLANs in the subsequent processing. In addition, a second-layer forwarding instance VSI (Virtual Switch Instance)=100 is provided, and the corresponding logical port is 10. The processing logic of the subsequent message is the same as that of a traditional switchboard. When the message of the VLAN 101-200 reaches the AC port identification table, only a query entry based on the port number Port1 as the keyword is issued. The VLAN Domian in the corresponding action table is changed to the U-TAG. The VLANID of the message is processed as an inner layer of the VLAN in the subsequent processing. The second-layer forwarding instance VSI=100 is output at the same time. The corresponding logical port is 11. A processing logic of the subsequent message is the same as that of the traditional switchboard.

In this embodiment, provided is a port configuration device. The device is configured to implement the forgoing embodiments and preferred implementations, and those that have been described are not repeated here. As used below, the term "module" may implement a combination of software and/or hardware with predetermined functions. Although the device described in the following embodiments is preferably implemented by software, implementation by hardware or a combination of software and hardware is also possible and conceived.

Figure 5:
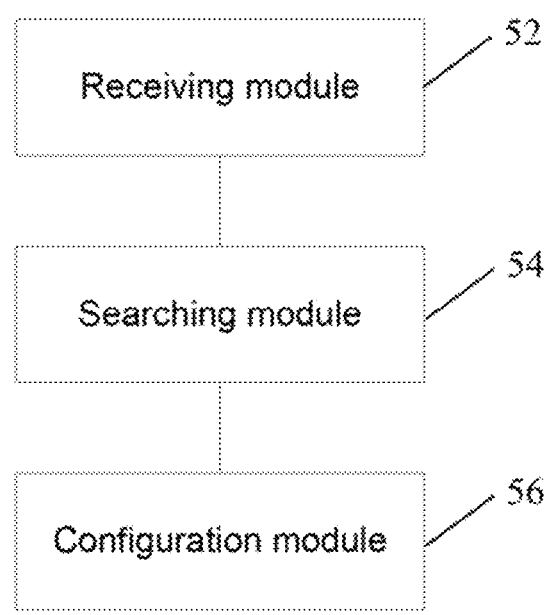
FIG. 5 is a structural block diagram of a port configuration device according to an embodiment of the present disclosure.

FIG. 5 is a structural block diagram of the port configuration device according to an embodiment of the present disclosure. As shown in FIG. 5, the device comprises: a receiving module 52, configured to receive a target message, the target message being a message which is transmitted through a physical port of a data link layer and carries target identifier information; a searching module 54, configured to search, in a plurality of access modes supported by the physical port, for a target access mode corresponding to the target identifier information; and a configuration module 56, configured to configure the current access mode of the physical port in the data link layer to be the target access mode.

In an optional embodiment, the searching module 54 further comprises: a searching unit, configured to search for the target access mode corresponding to the target identifier information in a preset port table, where the port table saves a mapping relationship between each of the plurality of access modes and the corresponding identifier information.

In an optional embodiment, the configuration module 56 is further configured to: generate a first keyword corresponding to the target message according to the target access mode; and configure a first identification bit corresponding to the target message in a physical port identification table as the first keyword, wherein the first keyword is configured to indicate as the target access mode in an execution action table an action for configuring the current access mode of the physical port.

In an optional embodiment, the configuration module 56 is further configured as: when the target access mode is a first mode, the first keyword is a default keyword and a target identifier carried in the target message; when the target access mode is a second mode, the first keyword is the default keyword; wherein the first mode is the access mode of the virtual local area network (VLAN), and the second mode is the Ethernet access mode.

In an optional embodiment, the configuration module 56 is further configured to: arrange a second keyword according to the first keyword in the action table according to the first keyword; arrange the second keyword as P-TAG in a case that the target access mode is the first mode; and arrange the second keyword as U-TAG in a case that the target access mode is the second mode.

In an optional embodiment, the device is further configured to: after the current access mode of the physical port in the data link layer is configured as the target access mode, use, as as logical ports currently carried on the physical port, a target logical port matching the target access mode in the plurality of logical ports, wherein the number of the physical port is one, and the plurality of logical ports are logical ports allowed to be carried on the physical port.

It should be noted that each of the forgoing modules may be implemented by software or hardware. The hardware may be implemented in the following manner, but not limited thereto: the forgoing modules are all positioned in the same processor; or, the forgoing modules are positioned in different processors in any combination form.

According to an embodiment of the present disclosure, further provided is a storage medium. A computer program is stored in the storage medium, where the computer program is configured to execute steps in any one of embodiments of a foregoing method when the computer program is operated.

in this embodiment, the storage medium may be configured to store a computer program for executing the following steps:

S1, receiving a target message, the target message being a message which is transmitted through a physical port of a data link layer and carries target identifier information.

S2, searching, in a plurality of access modes supported by the physical port, for a target access mode corresponding to the target identifier information.

S3: configuring a current access mode of the physical port in the data link layer to be the target access mode.

Optionally, in this embodiment, the storage medium may include, but is not limited to: U disk, a Read-Only Memory (ROM), a Random Access Memory (RAM), and various media that can store computer programs, such as a mobile hard disk, a magnetic disk, or an optical disk.

According to an embodiment of the present disclosure, further provided is an electronic device, comprising a memory and a processor. A computer program is stored in the memory. The processor is configured to execute the computer program to execute the steps in any one of embodiments of the forgoing method.

In an embodiment, the electronic device may further comprise a transmission apparatus and an input/output apparatus, where the transmission apparatus is connected to the processor, and the input/output apparatus is connected to the processor.

in this embodiment, the forgoing processor may be configured to execute the following steps through the computer program:

S1, receiving the target message, the target message being the message which is transmitted through the physical port of the data link layer and carries the target identifier information.

S2, searching, in the plurality of access modes supported by the physical port, for the target access mode corresponding to the target identifier information.

S3: configuring the current access mode of the physical port in the data link layer to be the target access mode.

In an embodiment, for specific examples in this embodiment, reference may be made to the examples described in the forgoing embodiments and optional implementations, and details are not described herein again in this embodiment.

Obviously, the person skilled in the art should understand that the forgoing modules or steps of the present disclosure may be implemented by a general computing device, and may be concentrated on a single computing device or allocated in a network consisting of the plurality of the computing devices. In an embodiment, the forgoing modules or steps of the present disclosure may be implemented with program codes executable by the computing device. Therefore, the forgoing modules or steps of the present disclosure may be stored in a storage device for execution by the computing device. In some cases, the steps shown or described may be executed in a different order than an order herein, or the steps are fabricated into individual integrated circuit modules respectively, or the plurality of modules or steps of the forgoing modules or steps is fabricated into a single integrated circuit module for implementation. In this way, the present disclosure is not limited to any specific combination of hardware and software.

The forgoing descriptions are only preferred embodiments of the present disclosure, and are not used to limit the present disclosure. For the person skilled in the art, the present disclosure can have various modifications and changes. Any modification, equivalent replacement and improvement made within the principle of the present disclosure shall be included within the protection scope of the present disclosure.

INDUSTRIAL APPLICABILITY

As described above, a port configuration method and device, a storage medium, and a electronic device provided by the embodiments of the present disclosure have the following beneficial effects: since a current access mode of a physical port can be configured as a target access mode by searching for a target access mode corresponding to a target message. Therefore, the problem of poor versatility of an AC port in a L2VPN network can be solved, thereby achieving the effect of improving the versatility of the AC port.

What is claimed is:

1. A port configuration method, comprising:
receiving a target message, the target message being a message which is transmitted through a physical port of a data link layer and carries target identifier information;
searching, in a plurality of access modes supported by the physical port, for a target access mode corresponding to the target identifier information; and
configuring a current access mode of the physical port in the data link layer to be the target access mode;
wherein searching, in the plurality of access modes supported by the physical port, for the target access mode corresponding to the target identifier information comprises:
searching for the target access mode corresponding to the target identifier information in a preset port table, where the port table saves a mapping relationship between each of the plurality of access modes and the corresponding identifier information;
wherein configuring a current access mode of the physical port in the data link layer to be the target access mode comprises:
generating a first keyword corresponding to the target message according to the target access mode;
configuring a first identification bit corresponding to the target message in a physical port identification table as the first keyword, and the first keyword indicating an action, in an execution action table, for configuring the current access mode of the physical port as the target access mode.

2. The method according to claim 1, wherein generating the first keyword corresponding to the target message according to the target access mode comprises:
In a case that the target access mode is a first mode, the first keyword is a default keyword and a target identifier carried in the target message;
In a case that the target access mode is a second mode, the first keyword is the default keyword;
the first mode is a virtual local area network (VLAN) access mode, and the second mode is an Ethernet access mode.

3. The method according to claim 1, wherein the first keyword indicating as the target the action in the execution action table for configuring the current access mode of the physical port as the target access mode comprises:
setting a second keyword corresponding to the first keyword in the action table according to the first keyword;
in a case that the target access mode is the first mode, setting the second keyword as P-TAG;
in a case that the target access mode is the second mode, setting the second keyword as U-TAG.

4. The method according to claim 2, wherein after configuring the current access mode of the physical port in the data link layer to be the target access mode, the method further comprises:
using a target logical port matching the target access mode in the plurality of logical ports as a logical port currently carried on the physical port, wherein the number of the physical port is one, and the plurality of logical ports are logical ports allowed to be carried on the physical port.

5. A port configuration device, comprising:
a receiving module, configured to receive a target message, the target message being a message which is transmitted through a physical port of a data link layer and carries target identifier information;
a searching module, configured to search, in a plurality of access modes supported by the physical port, for a target access mode corresponding to the target identifier information; and
a configuration module, configured to configure a current access mode of the physical port in the data link layer to be the target access mode;
wherein the searching module is further comprises:
a searching unit, configured to search for the target access mode corresponding to the target identifier information in a preset port table, the port table saving a mapping relationship between each of the plurality of access modes and the corresponding identifier information;
wherein the configuration module is further configured to generate a first keyword corresponding to the target message according to the target access mode, configure a first identification bit corresponding to the target message in a physical port identification table as the first keyword, and the first keyword indicating an action, in an execution action table, for configuring the current access mode of the physical port as the target access mode.

6. A non-transitory storage medium, wherein a computer program is stored in the storage medium, the computer program, when running, is configured to execute a method as claimed in claim 1.

7. An electronic device, comprising a memory and a processor, wherein a computer program is stored in the memory, and the processor is configured to execute the computer program to execute a method as claimed in claim 1.

8. The method according to claim 3, wherein after configuring the current access mode of the physical port in the data link layer to be the target access mode, the method further comprises:
using a target logical port matching the target access mode in the plurality of logical ports as a logical port currently carried on the physical port, wherein the number of the physical port is one, and the plurality of logical ports are logical ports allowed to be carried on the physical port.

9. A non-transitory storage medium, wherein a computer program is stored in the storage medium, the computer program, when running, is configured to execute a method as claimed in claim 2.

10. A non-transitory storage medium, wherein a computer program is stored in the storage medium, the computer program, when running, is configured to execute a method as claimed in claim 3.

11. An electronic device, comprising a memory and a processor, wherein a computer program is stored in the memory, and the processor is configured to execute the computer program to execute a method as claimed claim 2.

12. An electronic device, comprising a memory and a processor, wherein a computer program is stored in the memory, and the processor is configured to execute the computer program to execute a method as claimed claim 3.

13. An electronic device, comprising a memory and a processor, wherein a computer program is stored in the memory, and the processor is configured to execute the computer program to execute a method as claimed claim 4.

* * * * *